United States Patent
Watson et al.

(10) Patent No.: US 8,454,354 B2
(45) Date of Patent: Jun. 4, 2013

(54) HIGHLY RADIATIVE BURNER AND COMBUSTION PROCESS

(75) Inventors: Matthew James Watson, Bethlehem, PA (US); Mark Daniel D'Agostini, Ebensburg, PA (US); Jin Cao, Allentown, PA (US); Aleksandar Georgi Slavejkov, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 910 days.

(21) Appl. No.: 12/117,166

(22) Filed: May 8, 2008

(65) Prior Publication Data

US 2009/0280444 A1   Nov. 12, 2009

(51) Int. Cl.
*F23C 7/00* (2006.01)

(52) U.S. Cl.
USPC .......................................... 431/187; 431/284

(58) Field of Classification Search
USPC ................... 431/2, 5, 10, 12, 187, 284
See application file for complete search history.

(56) References Cited

U.S. PATENT DOCUMENTS

| | | | | |
|---|---|---|---|---|
| 2,412,579 A | * | 12/1946 | Hauzvic | 239/112 |
| 3,236,281 A | * | 2/1966 | Bain et al. | 75/516 |
| 3,453,084 A | * | 7/1969 | Just et al. | 423/450 |
| 3,489,108 A | * | 1/1970 | Davis et al. | 110/244 |
| 3,610,536 A | * | 10/1971 | Pease et al. | 239/412 |
| 3,615,053 A | * | 10/1971 | Pease et al. | 239/407 |
| 3,649,206 A | * | 3/1972 | Ivernel | 422/310 |
| 3,656,878 A | | 4/1972 | Wright | |
| 3,671,172 A | * | 6/1972 | Chedaille et al. | 431/174 |
| 3,748,082 A | * | 7/1973 | Ivernel | 431/8 |
| 4,203,717 A | * | 5/1980 | Facco et al. | 431/182 |
| 4,285,664 A | * | 8/1981 | Voorheis | 431/284 |
| 4,402,740 A | * | 9/1983 | Arp et al. | 75/653 |
| 4,978,367 A | | 12/1990 | Green | |
| 5,048,433 A | | 9/1991 | Green | |
| 5,199,866 A | | 4/1993 | Joshi | |
| 5,256,058 A | | 10/1993 | Slavejkov | |
| 5,346,390 A | | 9/1994 | Slavejkov | |
| 5,431,559 A | | 7/1995 | Taylor | |
| 5,547,368 A | | 8/1996 | Slavejkov | |
| 5,567,141 A | * | 10/1996 | Joshi et al. | 431/8 |
| 5,575,637 A | | 11/1996 | Slavejkov et al. | |
| 5,611,682 A | | 3/1997 | Slavejkov | |
| 5,617,997 A | | 4/1997 | Kobayashi | |

(Continued)

FOREIGN PATENT DOCUMENTS

GB   2 427 261 A   12/2006

OTHER PUBLICATIONS

Green et al.; Perry's Chemical Engineers' Handbook; McGraw-Hill; Seventh Edition; Cover Page, Copyright Page, and p. 2-120.*

(Continued)

*Primary Examiner* — Kenneth Rinehart
*Assistant Examiner* — Jorge Pereiro
(74) *Attorney, Agent, or Firm* — Bryan C. Hoke, Jr.; Larry S. Zelson

(57) ABSTRACT

An oxy-fuel burner that co-fires liquid fuel and gaseous fuel to create a more luminous flame. The characteristics of a liquid fuel spray and the gaseous fuel and primary oxidant gas flows, as well as the geometry of the burner is adapted to shroud the liquid fuel from the primary oxidant until it exits a precombustor and to prevent the liquid fuel from contacting the walls of the precombustor.

24 Claims, 7 Drawing Sheets

U.S. PATENT DOCUMENTS

| | | | |
|---|---|---|---|
| 5,993,203 A | 11/1999 | Koppang | |
| 6,068,468 A * | 5/2000 | Philippe et al. | 431/175 |
| 6,126,438 A * | 10/2000 | Joshi et al. | 431/161 |
| 6,128,894 A * | 10/2000 | Joos et al. | 60/776 |
| 6,422,041 B1 | 7/2002 | Simpson | |
| 6,524,097 B2 * | 2/2003 | Hoke et al. | 431/8 |
| 6,579,085 B1 * | 6/2003 | Satchell et al. | 431/8 |
| 6,702,571 B2 * | 3/2004 | Abbasi et al. | 431/187 |
| 6,705,117 B2 | 3/2004 | Simpson et al. | |
| 2002/0090584 A1 * | 7/2002 | Mohr | 431/10 |
| 2003/0157450 A1 * | 8/2003 | Joshi et al. | 431/161 |
| 2005/0263225 A1 | 12/2005 | Dudill et al. | |
| 2006/0035184 A1 | 2/2006 | D'Agostini | |

OTHER PUBLICATIONS

Gale et al.; Smithells Metals Reference Book; Elsevier Butterworth-Heinmann; Eighth Edition; Cover Page, Copyright Page, and p. 28-15.*

The Advanced Generation Oxy-Fuel Burners for Glass Furnaces, Geyskens, Jun. 2004.

Spoljaric, Davor, et al., Aluminium Meeting Technology with Oxy-Fuel Burners, Apr. 27, 2004.

* cited by examiner

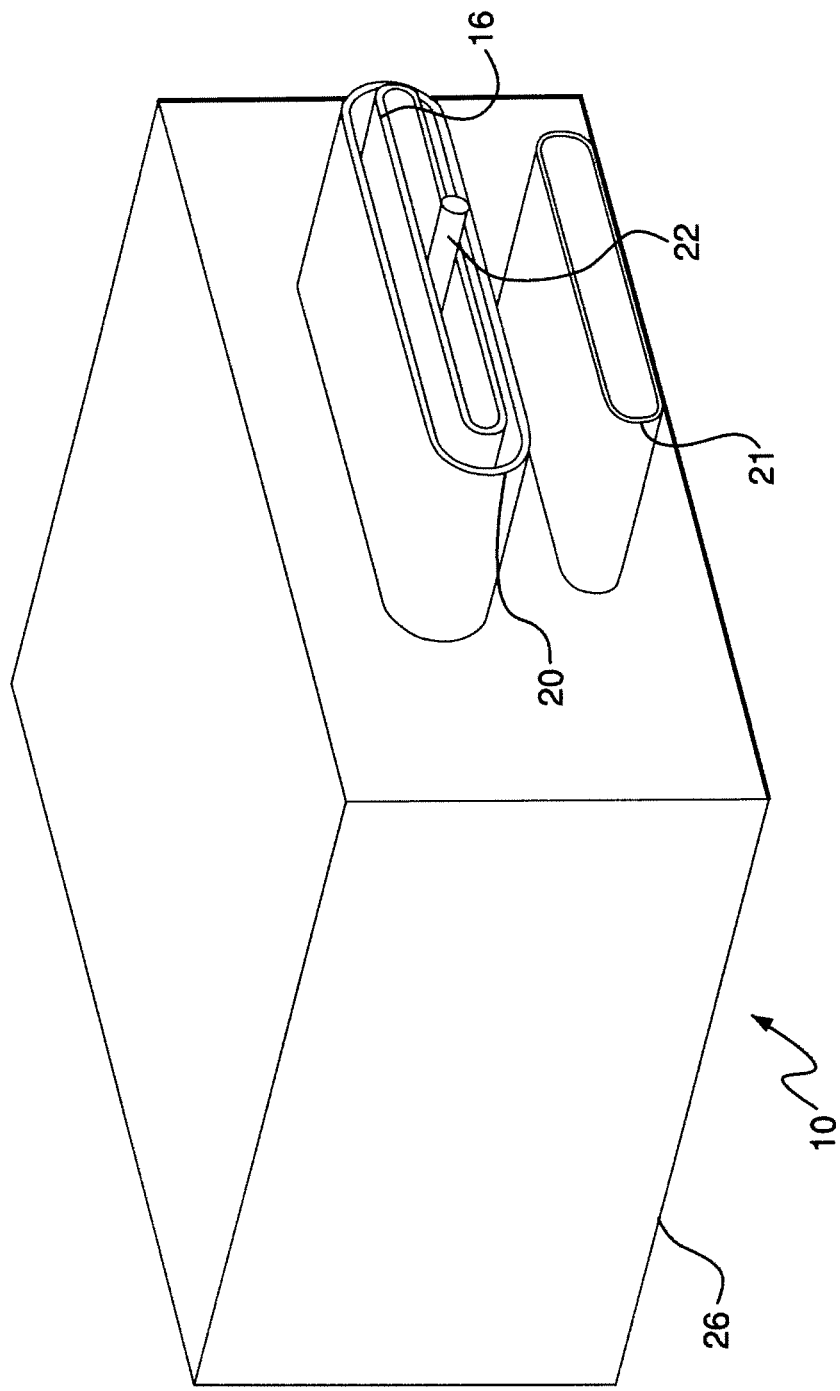

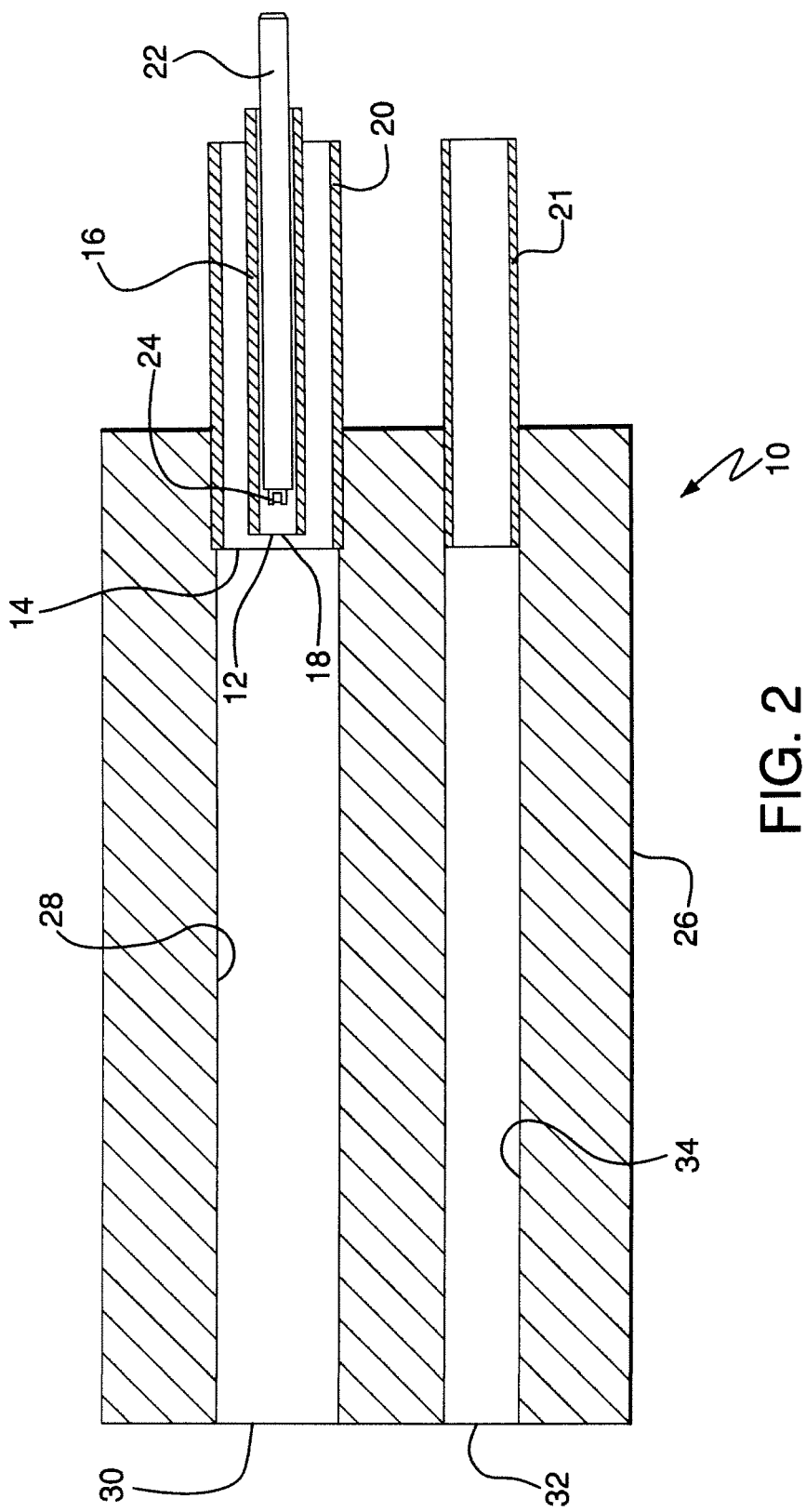

HIGHLY RADIATIVE BURNER AND COMBUSTION PROCESS

BACKGROUND

The present invention relates to oxy-fuel burners, which are commonly implemented to produce elevated temperatures in industrial melting or heating furnaces.

In many oxy-fuel burner applications, such as in furnaces for melting glass and metals, it is desirable to have a highly radiative (also referred to as "luminous") flame. It is believed that a highly radiative flame provides more efficient heat transfer to the material being heated, as well as more even heating, than a less radiative flame. A problem with gaseous fuels is that highly luminous flames are difficult to produce. While oxidant staging and the use of a precombustor have been used to improve flame luminosity of natural gas flames, more highly luminous flames are desirable.

Related art includes U.S. Pat. Nos. 5,575,637, 5,611,682 and 6,705,117, as well as U.S. Publication No. 2006/0035184.

BRIEF SUMMARY

The present invention relates to a burner and combustion process for producing more luminous flames from gaseous fuels.

In one respect, the burner comprises an oxidant conduit with a primary oxidant discharge orifice, a gaseous fuel conduit with a gaseous fuel discharge orifice in spaced relation to the primary oxidant discharge orifice, and a liquid fuel conduit with a liquid fuel nozzle located at a discharge end of the liquid fuel conduit, wherein the liquid fuel nozzle is in spaced relation to the gaseous fuel discharge orifice. The gaseous fuel discharge orifice is in spaced relation to the primary oxidant discharge orifice such that when in operation the oxidant forms a sleeve about the gaseous fuel. The primary oxidant conduit has a width-to-height ratio of at least 2 at the primary oxidant discharge orifice. The gaseous fuel conduit has a width-to-height ratio of at least 2 at the gaseous fuel discharge orifice. At least a portion of the gaseous fuel conduit is situated within the primary oxidant conduit. At least a portion of the liquid fuel conduit is situated within the gaseous fuel conduit. The liquid fuel nozzle may be capable of producing a spray with a width-to-height ratio greater than 1 or even greater than 2.

The burner may further comprise a precombustor passage that extends from the primary oxidant discharge orifice to a flame port. The precombustor passage has a shape which is complementary to the primary oxidant discharge orifice and has a width, $P_W$, and a height, $P_H$, wherein $$\frac{P_W}{P_H} \geq 2.$$

The liquid fuel nozzle may be capable of producing a spray with a width-to-height ratio greater than 1 and a spray angle in the width dimension which is in a range of 0.9 to 6.0 times or 1.6 to 5.0 times $$\arctan\left(\frac{0.5(P_W)}{P_L}\right).$$

The liquid fuel nozzle may be capable of producing a spray with a width-to-height ratio greater than 1 and a spray angle in the width dimension of up to 120 degrees. The liquid fuel nozzle may be capable of producing a spray with a width-to-height ratio greater than 1 and a spray angle in the width dimension between 30 and 95 degrees.

A liquid fuel discharge orifice of the liquid fuel nozzle is in spaced relation to the gaseous fuel discharge orifice in a position ranging from being recessed 3 times the height of the gaseous fuel discharge orifice and protruding 0.75 times the height of the gaseous fuel discharge orifice. Alternatively, the liquid fuel discharge orifice may be in a position ranging from being recessed 3 times the height of the gaseous fuel discharge orifice and even or flush with the gaseous fuel discharge orifice.

In another respect, the burner comprises a primary oxidant conduit with a primary oxidant discharge orifice, a gaseous fuel conduit with a gaseous fuel discharge orifice in spaced relation to the primary oxidant discharge orifice, and a liquid fuel conduit with a liquid fuel nozzle located at a discharge end of the liquid fuel conduit. The gaseous fuel conduit has a cross-sectional area, $A_1$. At least a portion of the gaseous fuel conduit is situated within the primary oxidant conduit. The liquid fuel nozzle is in spaced relation to the gaseous fuel discharge orifice and has a cross-sectional area, $A_2$. At least a portion of the liquid fuel conduit is situated within the gaseous fuel conduit and $$200 \leq \frac{A_1}{A_2}.$$

Alternatively, $$500 \leq \frac{A_1}{A_2} \leq 74{,}000.$$

The burner may further comprise a precombustor passage that extends from the primary oxidant discharge orifice to a flame port. The precombustor passage may be formed from a burner block.

The burner may further comprise an oxidant staging passage terminating in an oxidant staging port wherein at least a portion of the oxidant staging passage is directly underneath the precombustor passage.

In one respect, the combustion process comprises injecting a liquid fuel from a nozzle into a precombustor passage, injecting a gaseous fuel through a gaseous fuel discharge orifice into the precombustor passage thereby forming a sleeve of gaseous fuel about the liquid fuel proximate the nozzle, introducing a first oxidant gas through a primary oxidant discharge orifice into the precombustor passage thereby forming a sleeve of the first oxidant gas about the gaseous fuel proximate the gaseous fuel discharge orifice; combusting a portion of the gaseous fuel with a portion of the oxidant gas in the precombustor passage to form a partially combusted mix, and passing the partially combusted mix into a furnace for further combustion thereof. The liquid fuel has an effective momentum rate $M_L$ at the nozzle and the gaseous fuel has a momentum rate $M_G$ at the gaseous fuel discharge orifice, wherein $M_L$ is less than $M_G$. $M_L$ may be less than $0.8 \times M_G$. The furnace may be a glass-melting furnace. The furnace may be a metal-melting furnace.

At least a portion of the liquid fuel may be thermally cracked in the precombustor passage.

The process may further comprise introducing a staging oxidant gas into the furnace, and combusting a portion of the partially combusted mix with at least a portion of the staging oxidant gas in the furnace In the process, $v_L$ may be less than $v_G$, where $v_L$ is the bulk velocity of the liquid fuel at the nozzle, and $v_G$ is velocity of the gaseous fuel at the gaseous fuel discharge orifice.

In the process, the liquid fuel may have a mass flow rate $m_{LF}$ at the nozzle, and the gaseous fuel may have a mass flow rate $m_{GF}$ at the gaseous fuel discharge orifice, wherein $m_{LF} \leq 0.72 \times m_{GF}$. Further, $m_{LF}$ may be in the range of $0.0017 \times m_{GF}$ to $0.36 \times m_{GF}$.

In the process, the liquid fuel may have a bulk velocity $v_L$ at the nozzle and the gaseous fuel may have a velocity $v_G$ at the gaseous fuel discharge orifice wherein $$\frac{v_L \left| \sin\left(\frac{A}{2}\right) \right|}{v_G} < 1,$$

where A is the liquid fuel spray angle in the width dimension.

In the process, the first oxidant gas may comprise at least 23 vol. % oxygen, or at least 50 vol. % oxygen, or at least 80 vol. % oxygen, or at least 95 vol. %. The first oxidant gas may have an oxygen concentration up to essentially 100 vol. % oxygen.

In another respect, the combustion process comprises injecting a liquid fuel into a precombustor passage at a mass flow rate $m_{LF}$, injecting a gaseous fuel into the precombustor passage at a mass flow rate $m_{GF}$, introducing an oxidant gas into the precombustor passage, combusting a portion of the gaseous fuel with a portion of the oxidant gas in the precombustor passage to form a partially combusted mix, and passing the partially combusted mix into a furnace for further combustion thereof. The liquid fuel has a higher heating value $HHV_{LF}$ and the gaseous fuel has a higher heating value $HHV_{GF}$. The liquid fuel and the gaseous fuel are injected such that $HHV_{GF} \times m_{GF} > 9 \times HHV_{LF} \times m_{LF}$. The oxidant gas has an oxygen concentration of at least 23 vol. % or at least 50 vol. % oxygen or at least 80 vol. % oxygen or at least 95 vol. %. The maximum oxygen concentration may be essentially 100 vol. % oxygen.

BRIEF DESCRIPTION OF THE DRAWINGS

The following detailed description of the preferred embodiments of the invention will be better understood when read in conjunction with the appended drawings. For purposes of illustrating the invention, drawings depict the embodiments which are presently preferred. It is understood, however, that the invention is not limited to the precise arrangements and instrumentality shown in the drawings:

FIG. 1b is a rear perspective view thereof;

FIG. 2 is a sectional view taken along line 2-2 of FIG. 1a;

FIG. 3 is a front view of the oxy-fuel burner shown in FIG. 1a;

FIG. 5 is an enlarged sectional view taken along line 5-5 of FIG. 1a; and

DETAILED DESCRIPTION

Figure 1A:
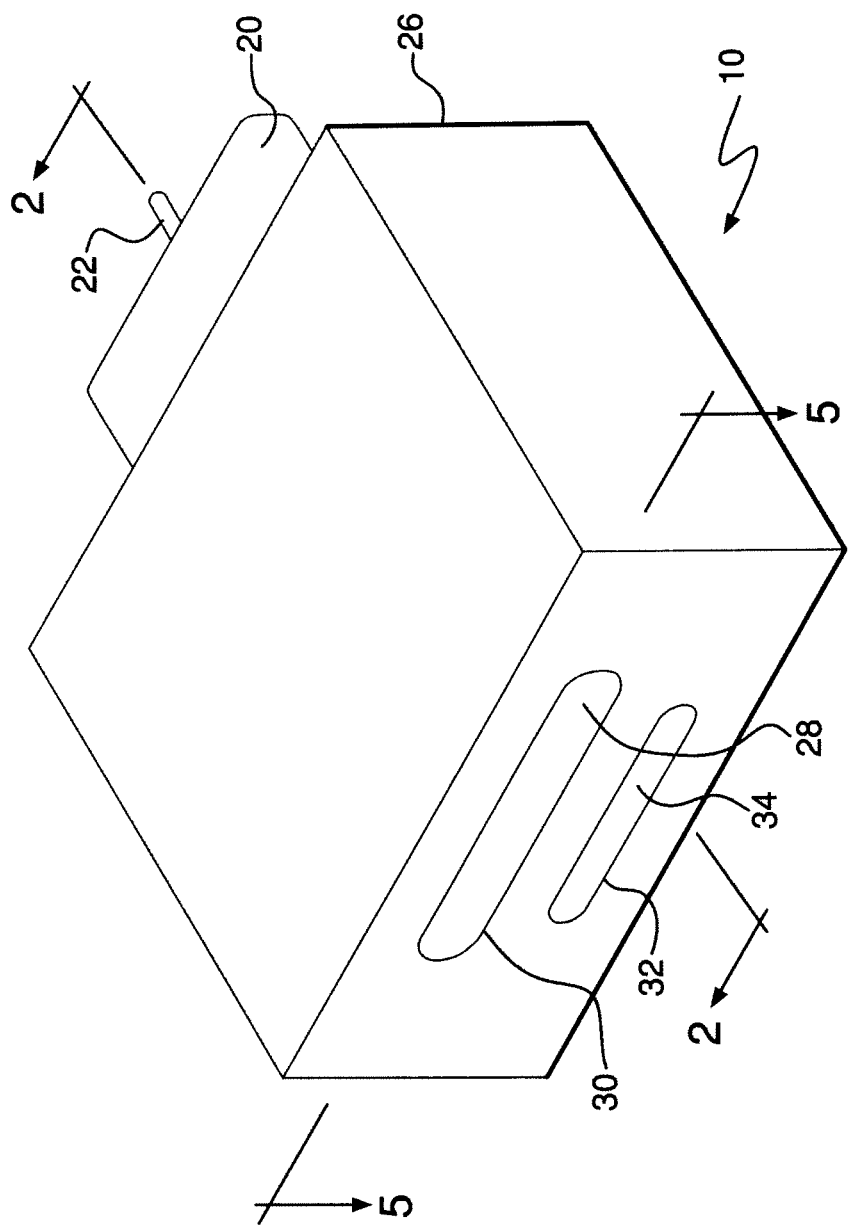
FIG. 1a is a front perspective view of a preferred embodiment of an oxy-fuel burner according to the present invention.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

The present invention relates to a burner and combustion process for producing more luminous flames from gaseous fuels. The present invention relates more specifically to an oxy-fuel burner and combustion process for combusting a gaseous fuel such as natural gas with a small amount of liquid fuel co-fired with the gaseous fuel.

The burner is specially designed to increase the generation of soot from the liquid/gaseous fuel mixture which, in turn, increases the luminosity of the burner flame. In the context of the present invention, "soot" or "soot particles" comprise particulate matter that is generated as a result of incomplete combustion or cracking of liquid or gaseous fuels, or a mixture of liquid and gaseous fuels.

A preferred embodiment of the present invention is shown in FIGS. 1a through 3 and comprises a burner which is referred to generally as burner 10. Burner 10 includes a primary oxidant conduit 20 with a primary oxidant discharge orifice 14, a gaseous fuel conduit 16 with a gaseous fuel discharge orifice 18 in space relation to the primary oxidant discharge orifice 14, and a liquid fuel conduit 22 with a liquid fuel nozzle 24 located at a discharge end of the liquid fuel conduit 22. The liquid fuel nozzle is in spaced relation to the gaseous fuel discharge orifice 18 such that in operation the gaseous fuel forms a sleeve of gaseous fuel about the liquid fuel proximate the nozzle. The liquid fuel nozzle may be fixed or adjustable in relation to the gaseous fuel discharge orifice. When the burner is in operation, the liquid fuel nozzle will be set in a desired position relative to the gaseous fuel discharge orifice. At least a portion of the gaseous fuel conduit 16 is situated within the primary oxidant conduit 20 and at least a portion of the liquid fuel conduit 22 is situated within the gaseous fuel conduit 16. The primary oxidant conduit 20, the gaseous fuel conduit 16, and the liquid fuel conduit 22 deliver an oxidant gas, a gaseous fuel and a liquid fuel, respectively.

As used in the specification and claims, a length direction of an element corresponds to the primary direction of the gaseous fuel flow. Width and height dimension are orthogonal to each other and orthogonal to the length dimension. The width dimension is greater than the height dimension. For example, the width dimension of the oxidant staging port 32 in FIG. 3 corresponds to the dimension in the direction $W_s$. Similarly, for example, the height dimension of the oxidant staging port 32 in FIG. 3 corresponds to the dimension in the direction H. In addition, as used in the specification and claims, terms that refer to a relative location, such as above, beneath, etc., should be understood to refer to the burner 10 of the present invention in the orientation shown in FIGS. 1a through 3. In addition, for elements having more than one width dimension, the width shall be understood to mean the maximum width dimension and for elements having more than one height dimension, the height shall be understood to mean the maximum height dimension.

As used in the specification and claims, the terms "spray angle" and "spray pattern" refer to the theoretical or design characteristics of a spray nozzle when operated within design specifications for fluid pressure and flow rate ranges at the nozzle. The spray angle is the opening angle which the nozzle jet of droplets forms at the moment when it leaves the nozzle orifice. The spray angle may vary at different angular positions around the nozzle. The spray angle in the width dimension is the largest spray angle in a plane emanating from the spray nozzle. For example the spray nozzle may be a so-called flat jet nozzle having a much larger width dimension than height dimension. The spray angle in the width dimension is determined from the measured width dimension. For the purposes of this disclosure, the spray characteristics are determined at a distance 5 cm from the spray orifice, with the nozzle in a horizontal orientation. It should be understood that the actual shape of the nozzle spray may differ from the theoretical spray angle and/or spray pattern under actual operating conditions. For example, a spray will often taper as the fluid moves away from the nozzle, resulting in a smaller spray width at a given distance from the nozzle than would be expected based on the theoretical spray angle for that nozzle.

Although not shown in the drawings, in operation, the liquid fuel conduit 22 is connected to a source of the liquid fuel, the primary oxidant conduit 20 is connected to a source of oxidant gas and the gaseous fuel conduit 16 is connected to a source of gaseous fuel. The liquid fuel may be fuel oil having an energy value of about 39000 to 40500 million Joules per cubic meter ($MJ/m^3$), the gaseous fuel may be natural gas having an energy value of about 36 to 38 $MJ/m^3$ per cubic meter, the oxidant gas may be oxygen-enriched air or industrial oxygen. The liquid fuel could comprise any hydrocarbon fuel, such as heavy fuel oil, medium fuel oil, light fuel oil, kerosene, diesel, ethanol, methanol and/or mixtures thereof, as well as slurries containing one or more solid fuels, such as coal, coke, and petroleum-coke. The gaseous fuel could comprise hydrogen, carbon monoxide, methane, propane, butane, town gas, producer gas, and mixtures thereof, for example. The oxidant gas could comprise any gas having an oxygen concentration of at least 23 percent on a volumetric basis and preferably greater than 30 percent oxygen. The oxidant gas may comprise at least 23 vol. % oxygen, or at least 50 vol. % oxygen, or at least 80 vol. % oxygen, or at least 95 vol. %. The maximum oxygen concentration may be essentially 100 vol. % oxygen.

The burner 10 includes a flame end 12 from which the oxidant gas, gaseous fuel and liquid fuel exit the burner 10. The flame end 12 of the burner 10 is preferably contained within a burner block 26, which protects the burner 10, provides a means for mounting the burner 10 to the wall of a furnace, and, as will be described in greater detail herein, defines a precombustor 28 and an oxidant staging passage 34. As noted above, the burner 10 can be used with a variety of furnaces, including, but not limited to, glass-melting and metal-melting furnaces.

The liquid fuel conduit 22 comprises a relatively small pipe which, in this embodiment, is vertically and horizontally centered within the gaseous fuel conduit 16. In this embodiment, the liquid fuel conduit 22 extends into the burner block 26. The liquid fuel conduit 22 terminates at a nozzle 24, which is located at the flame end 12 of the burner 10. At least a portion of the liquid fuel conduit is situated within at least a portion of the gaseous fuel conduit 16. The gaseous fuel conduit 16 and the liquid fuel conduit 22 define an annular gaseous fuel passage between the gaseous conduit 16 and the liquid fuel conduit 22. The gaseous fuel passage terminates at a gaseous fuel discharge orifice 18 which is located at the flame end 12 of the gaseous fuel conduit 16. The gaseous fuel conduit 16 may have a width-to-height ratio of at least 2, or a width-to-height ratio in the range of 5 to 8, at the gaseous fuel discharge orifice 18.

The gaseous fuel conduit with a gaseous fuel discharge orifice is in spaced relation to the primary oxidant discharge orifice and at least a portion of the gaseous fuel conduit 16 is situated within at least a portion of the primary oxidant conduit 20 and a portion of each are located within the burner block 26. The gaseous fuel discharge orifice may be fixed or adjustable in relation to the primary oxidant discharge orifice. When the burner is in operation, the gaseous discharge orifice will be set in a desired position relative to the primary oxidant discharge orifice. The gaseous fuel discharge orifice and primary oxidant discharge orifice are positioned such that in operation they form a sleeve of oxidant gas about the gaseous fuel proximate the gaseous fuel discharge orifice. Gaseous fuel conduit 16 and primary oxidant conduit 20 define an oxidant passage located between the gaseous fuel conduit 16 and the primary oxidant conduit 20. The oxidant conduit 20 terminates at an oxidant discharge orifice 14, which is located at the flame end 12 of the burner 10. The oxidant conduit 20 may have a width-to-height ratio of at least 2 or a width-to-height ratio in the range of 5 to 8 at the oxidant discharge orifice 14. The primary oxidant discharge orifice 14 and gaseous fuel discharge orifice 18 are both preferably oblong in shape. In this embodiment, each comprises an elongated rectangular shape with semi-circular ends.

Figure 4:
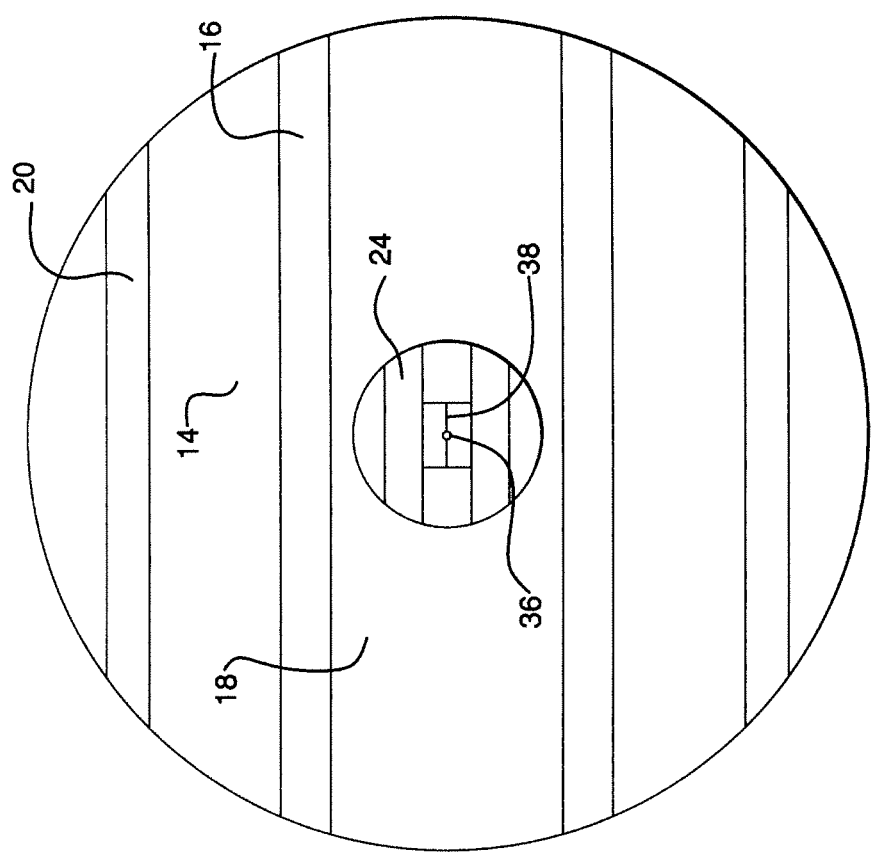
FIG. 4 is an enlarged partial view of area 4-4 of FIG. 3.

The nozzle 24 is preferably an atomizing nozzle, which discharges the liquid fuel in small droplets. Referring to FIG. 4, in this embodiment, the nozzle 24 comprises a pressure atomizing nozzle having a spray orifice 36 (also referred to more generally as a liquid fuel discharge orifice), through which the liquid fuel flows, and a spray tip 38. Alternatively, the nozzle 24 could comprise a gas-assisted atomizing nozzle, which would require a source of pressurized gas, for example air, (not shown) to the nozzle. An example of a device incorporating a gas-atomizing nozzle is shown in U.S. Publication No. 2005/0263225, which is incorporated herein by reference as if fully set forth. Referring again to FIG. 2, the flame end 12 of the nozzle 24 may be even or flush with the gaseous fuel discharge orifice 18 or slightly recessed (e.g., up to 3.0 times the height of the gaseous fuel discharge orifice 18) with respect to the gaseous fuel discharge orifice 18. The nozzle 24 could protrude up to 0.75 times the height of the gaseous fuel discharge orifice 18 with respect to the gaseous fuel discharge orifice 18 without causing significant performance degradation.

The burner block 26 includes a precombustor 28, which extends beyond the flame end 12 of the burner 10. The liquid and gaseous fuels pass through the precombustor 28 and into the furnace to which the burner 10 is mounted. The precombustor 28 helps maintain a flat flame shape and improves the combustion characteristics of the gaseous fuel and, as will be described in greater detail herein, the liquid fuel. The precombustor 28 preferably has the same cross-sectional geometry as the oxidant discharge orifice 14 (including a preferred width-to-height ratio of at least 2), but may be slightly larger. The precombustor 28 preferably overlaps a portion of the flame end 12 of the burner 10 and extends to a flame port 30. The precombustor 28 may diverge slightly from the flame end 12 to the flame port 30 (e.g., at a half-angle of no more than 15 degrees).

When the burner 10 is operated, the gaseous fuel is ignited, which produces a long, flat annular flame sheet inside of the precombustor and extending from the flame port 30. The flame sheet is surrounded by a sleeve of protective oxygen annular flow which prevents flame impingement on the walls of the precombustor 28, thereby preventing damage to the precombustor 28 and the burner block 26. Under many operating conditions, a portion of the liquid and gaseous fuels combusts with the primary oxidant gas in the furnace (i.e., after exiting the precombustor 28).

The burner block 26 may also include an oxidant staging passage 34 wherein at least a portion of the oxidant staging passage 34 is located directly underneath the precombustor passage 28, and may be parallel thereto and may have a similar cross-sectional shape (i.e., an elongated rectangle with semi-circular ends). The oxidant staging passage 34 is connected to an oxidant staging conduit 21 at one end and terminates at an oxidant staging port 32, which is located beneath the flame port 30 of the precombustor 28. The oxidant staging port 32 may also diverge from the flame end 12 to the flame port end 30 at a half-angle of no more than 10 degrees. When the burner 10 is operated, staging oxidant gas flows from the staging oxidant conduit 21 through the oxidant staging passage 34, combusts with a portion of the gaseous fuel in the furnace, and produces a highly radiant, fuel-rich flame from the flame port 30. The staging oxidant gas may have the same or different composition than the oxidant gas from primary oxidant conduit 20. As compared to a non-staged burner, oxidant staging increases the overall luminosity by producing a flame with a sooty top layer and an intensely luminous underside and thereby positions the highly radiant portion of the flame above the material being heated (also referred to as the "furnace load").

Figure 5:
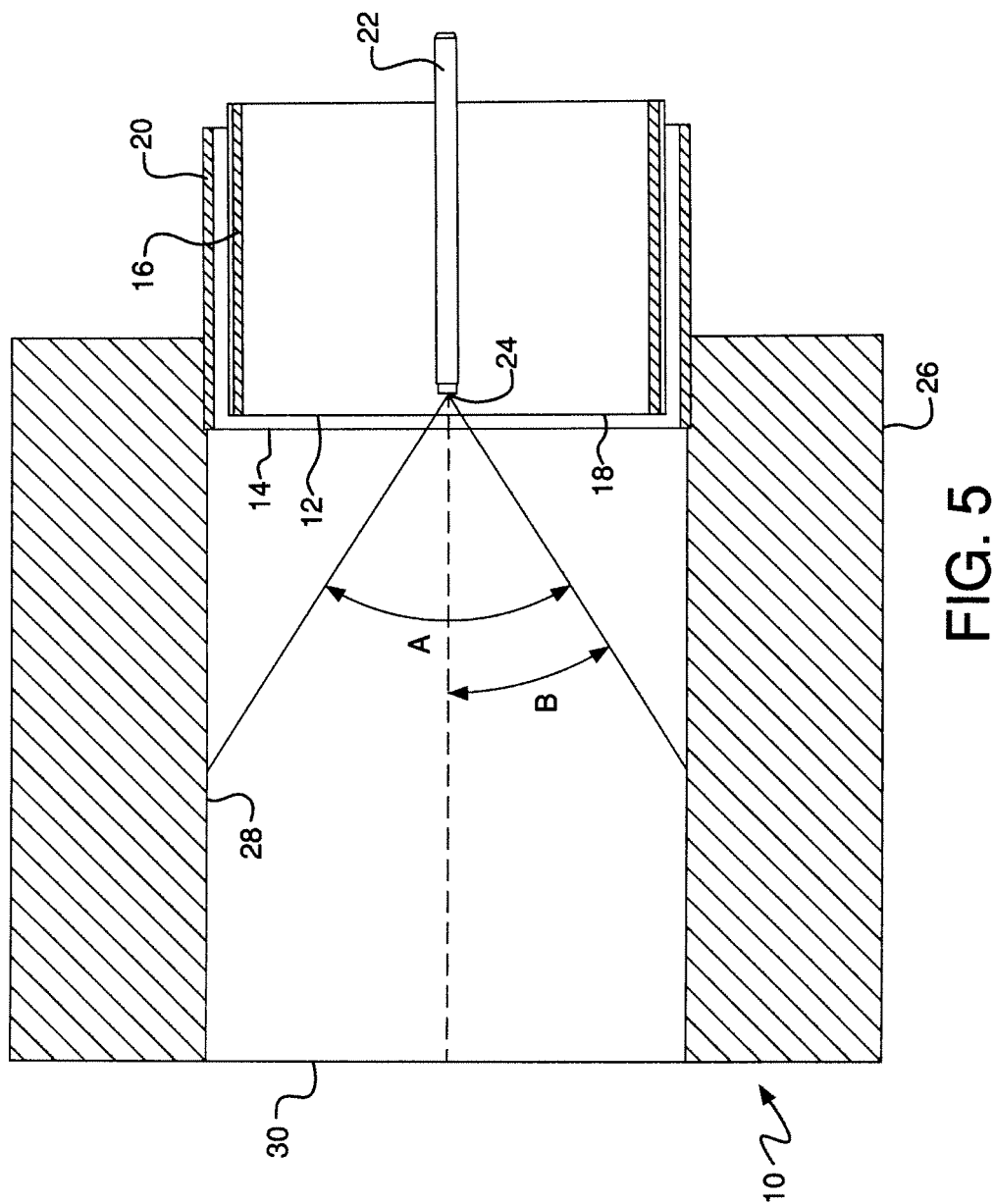

It is desirable for the liquid fuel nozzle 24 to have a spray profile (comprising a spray angle in the width dimension and a spray pattern) that fills a significant portion of the precombustor 28, prevents full combustion of the liquid fuel in the precombustor 28, and does not result in liquid fuel coming in contact with the walls of the precombustor 28. The preferred spray profile(s) for a specific embodiment of the burner 10 will depend upon several parameters, including the geometry of the precombustor 28 and the geometry and gaseous fuel flow rate through the gaseous fuel discharge orifice 18. For example, the spray angle in the width dimension of the nozzle 24 (see angle A and half angle B of FIG. 5) may be in the range of 0.9 to 6.0 or in the range of 1.6 to 5.0 times the value of:

$$\arctan\left(\frac{0.5(P_W)}{P_L}\right)$$

where $P_L$ is the length of the precombustor 28 (taken along the broken line shown in FIG. 5), and $P_W$=width of the precombustor 28.

Based on the geometry of the precombustor 28, the nozzle 24 may produce a flat spray pattern. More specifically, the width-to-height ratio of the spray is greater than 1, and may be greater than 2, and may be in the range of 4 to 16. The nozzle 24 may have a spray angle in the width dimension (see angle A of FIG. 5) of up to 120 degrees or may have a spray angle in the width dimension between 30 and 95 degrees.

Suitable nozzles are commercially available and may be selected without undue experimentation.

Suitable materials of construction for burners and burner blocks are known in the art. The burner and burner block as described herein may be fabricated by known means.

When the burner 10 is operated, it is preferable for the liquid fuel to account for no more than 10 percent of the total energy of the burner flame. Additionally, the velocity of the liquid fuel exiting at the spray orifice 36 is preferably less than the velocity of the gaseous fuel as it exits the gaseous fuel discharge orifice 18.

The mass flow rate of the liquid fuel $m_{LF}$ at the spray orifice 36 may be less than 0.72 times the mass flow rate of the gaseous fuel $m_{GF}$ at the gaseous fuel orifice 18. The mass flow rate of the liquid fuel $m_{LF}$ may be between 0.0017 to 0.36 or between 0.022 and 0.14 times the mass flow rate of the gaseous fuel $m_{GF}$.

In a first respect, the combustion process comprises injecting a liquid fuel from a nozzle into a precombustor passage, injecting a gaseous fuel through a gaseous fuel discharge orifice into the precombustor passage thereby forming a sleeve of gaseous fuel about the liquid fuel proximate the nozzle. The sleeve of gaseous fuel about the liquid fuel is an open-ended enclosure of gaseous fuel surrounding the liquid as the liquid fuel exists the nozzle.

The combustion process further comprises, introducing a first oxidant gas through a primary oxidant discharge orifice into the precombustor passage thereby forming a sleeve of the first oxidant gas about the gaseous fuel proximate the gaseous fuel discharge orifice. The sleeve of the first oxidant about the gaseous fuel is an open-ended enclosure of first oxidant surrounding the gaseous fuel as the gaseous fuel exits the gaseous fuel discharge orifice.

The combustion process further comprises combusting a portion of the gaseous fuel with a portion of the first oxidant gas in the precombustor passage to form a partially combusted mix. Only a portion of the gaseous fuel combusts with a portion of the first oxidant gas in the precombustor passage thereby forming the partially combusted mix. The heat from the combustion may thermally crack at least a portion of the liquid fuel in the precombustor passage and may also thermally crack a portion of the gaseous fuel. This thermal cracking produces soot particles which, upon combustion in the furnace, help to produce a more luminous flame. The partially combusted mix may contain unburned gaseous fuel, unburned liquid fuel, products of combustion, intermediate products of combustion such as CO and soot, and unreacted oxidant gas.

In this first respect, the combustion process further comprises passing the partially combusted mix into a furnace for further combustion of the partially combusted mix.

The relationships between the momentum rates of the liquid and gaseous fuels affect the performance of the burner 10. It should be noted that the term "momentum rate," as used in the specification and drawings, is equal to the product of the mass flow rate of the fluid being considered and the velocity of the fluid being considered. The mass flow rates of the liquid and gaseous fuels can be determined by multiplying the volumetric flow rate of the fluid by the density of the fluid. For a gas-assisted atomizing nozzle, the mass flow rate of the mixture of atomizing gas and liquid fuel is the summation of the atomizing gas mass flow rate and the liquid fuel mass flow rate.

Similarly, the velocity of the liquid fuel at the spray orifice 36 can be determined by dividing the volumetric flow rate by the size (cross-sectional area) of the spray orifice 36 of the nozzle 24. In the case of a gas-assisted atomizing nozzle, the velocity of the atomizing gas and liquid fuel mixture at the spray orifice 36 can be determined by dividing the summation of the volumetric flow rate of the atomizing gas and liquid fuel by the size (cross-sectional area) of the spray orifice 36 of the nozzle 24.

The mass flow rate of the gaseous fuel can be determined by dividing the firing rate of the burner 10 by the energy value of the gaseous fuel (which is typically expressed volumetrically), then multiplying the quotient by the density of the gaseous fuel (which can be calculated for operating conditions by taking into account the temperature and the pressure conditions at the point of calculation. Similarly, the velocity of the gaseous fuel can be calculated by dividing volumetric flow rate by the gaseous fuel discharge area, which is equal to the cross-sectional area of the gaseous fuel discharge orifice 18 minus the cross-sectional area taken up by the nozzle 24.

For the calculation of flow, momentum, velocity and the like, it is convenient to use the temperature and pressure conditions at the spray orifice 36 for the liquid fuel, and the temperature and pressure conditions at the gaseous fuel discharge orifice 18 for the gaseous fuel Based on these relationships, the momentum rates M of the liquid fuel and the gaseous fuel can be calculated in accordance with the following equation:

$$M = mv = m\frac{V}{A_o};$$

where:

M=momentum rate;
m=mass flow rate;
v=bulk velocity=$V/A_O$;
V=volumetric flow rate; and
$A_o$=cross sectional area of the respective discharge orifice.

The momentum rate of the liquid fuel has axial and transverse components. For the purposes of this application, the axial direction is defined as the direction of bulk gas flow in a precombustor, which is along the axis defined by the broken line in FIG. 5. The axial momentum rate of the gaseous fuel is equal to the overall momentum rate of the gaseous fuel, which can be calculated in the manner described above because the transverse component of the gaseous fuel at the gaseous fuel discharge orifice 18 is essentially zero. For the liquid fuel, it is convenient to calculate an effective momentum rate $M_L$ at the liquid fuel discharge orifice 36 per the above equation, while recognizing the fact that the effective momentum rate incorporates both axial and transverse components into one parameter, $M_L$.

Figure 3:
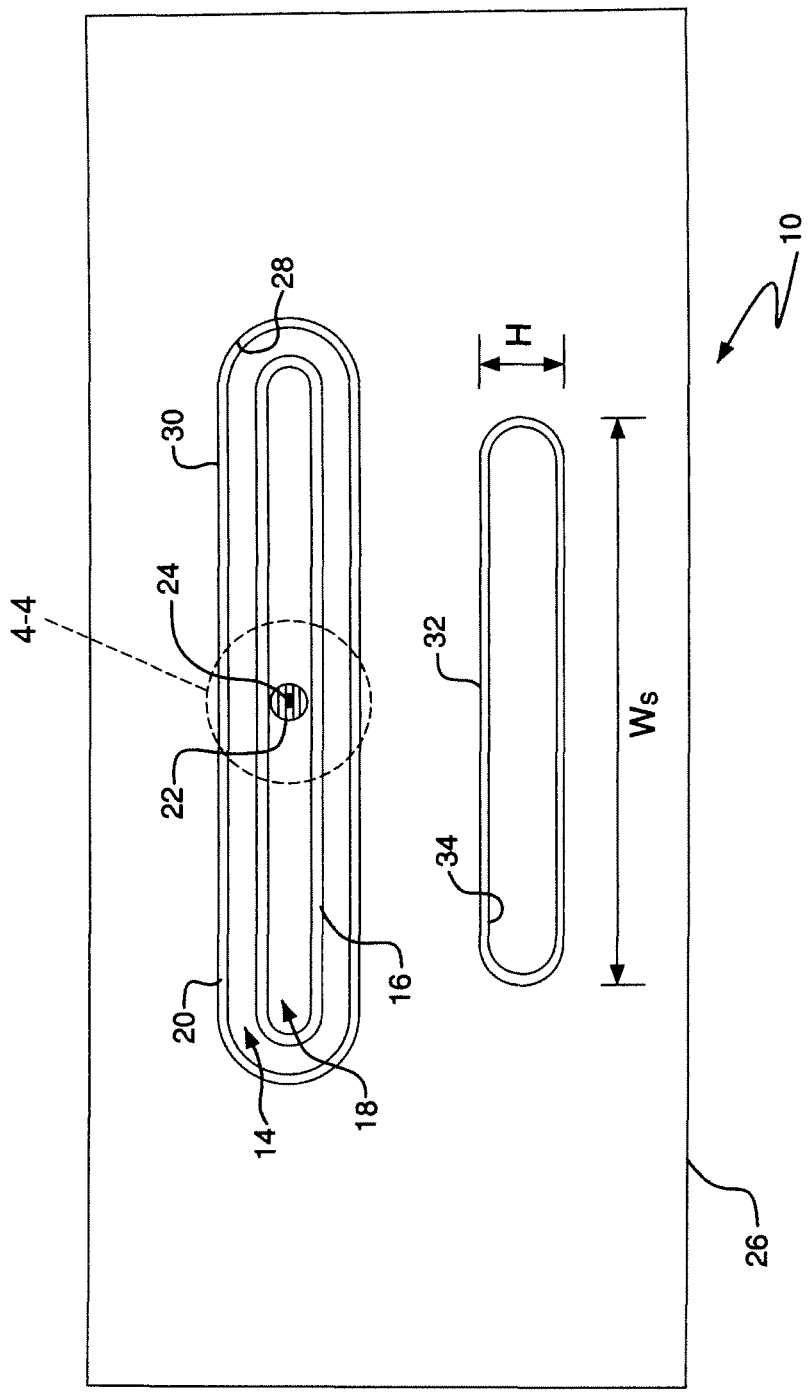

The maximum absolute transverse components of the velocity of the liquid fuel, $v_{LF}$ (transverse), in the direction indicated by $W_S$ in FIG. 3, can be calculated using the following equations:

$$v_{LF}(\text{transverse}) = \frac{V_L}{A_{OL}}\left|\sin\left(\frac{A}{2}\right)\right|$$

where:

$V_L$=volumetric flow rate of the liquid fuel
$A_{OL}$=cross sectional area of the liquid fuel discharge orifice, and
A=liquid fuel spray angle in the width dimension.

The effective momentum rate of the liquid fuel $M_L$ as it exits the nozzle 24 at the liquid fuel discharge orifice 36 may be less than the momentum rate of the gaseous fuel $M_G$ as it exits the gaseous fuel discharge orifice 18. $M_L$ may be less than $0.8 \times M_G$.

The ratio of the maximum absolute transverse velocity of the liquid fuel $v_{LF}$ (transverse) as it exits the nozzle 24 at the liquid fuel discharge orifice 36 to the velocity of the gaseous fuel $v_G$ as it exits the gaseous fuel discharge orifice 18 may be less than 1.0. The ratio $$\frac{v_{LF}(\text{transverse})}{v_G}$$

maybe less than 0.8 or less than 0.5.

Using a relatively small liquid fuel fraction and supplying the liquid fuel at a relatively low effective momentum rate (compared to the momentum rate of the gaseous fuel) provides several beneficial features. In order to improve flame luminosity, it is desirable to maximize the production of soot particles through heating and cracking of the liquid fuel. More specifically, it is desirable for the liquid fuel to be cracked as it travels from the nozzle 24 through the precombustor 28 and to not fully combust until after exiting the precombustor 28 at the flame port 30. Delaying complete combustion of the liquid fuel until it exits the precombustor 28 requires that the liquid fuel rich portion of the flame (i.e., the central portion of the flame) be at least partially shrouded from the oxidant gas by the gaseous fuel exiting the gaseous fuel discharge orifice 18. This is accomplished through a combination of (a) the relative flow rate of the liquid fuel, (b) the spray pattern of the nozzle 24 and (c) the relative geometries of the oxidant discharge orifice 14, the gaseous fuel discharge orifice 18 and the precombustor 28.

In addition, the spray characteristics of the nozzle 24 and the relatively low liquid fuel flow rate allow the liquid fuel to be well-integrated into the gaseous fuel flame. The relatively low flow rate of liquid fuel in the burner 10 of the present invention also enables the use of a small-diameter tube for the liquid fuel conduit 22 and a spray orifice 36 having a relatively small cross-sectional area, both of which minimize disturbance of the gaseous fuel flow in the gaseous fuel passage. The cross-sectional areas of the gaseous fuel discharge orifice 18 may be at least 200 times the cross-sectional area of the spray orifice 36, and may be in the range of 500 to 74,000 times the cross-sectional area of the spray orifice 36, and may be in the range of 1800 to 65,000 times the cross-sectional area of the spray orifice 36. The spray orifice 36 may have an equivalent diameter in the range of 0.011 to 0.12 inches and the gaseous fuel discharge orifice 18 may have a cross-sectional area of about 0.5 to 7.0 square inches.

In another respect, the product of the higher heating value and mass flow rate of the gaseous fuel exiting the gaseous fuel discharge orifice 18 is preferably at least 9 times greater than the product of the higher heating value of the liquid fuel multiplied by the mass flow rate of the liquid fuel rate at the spray orifice 36.

Figure 6:
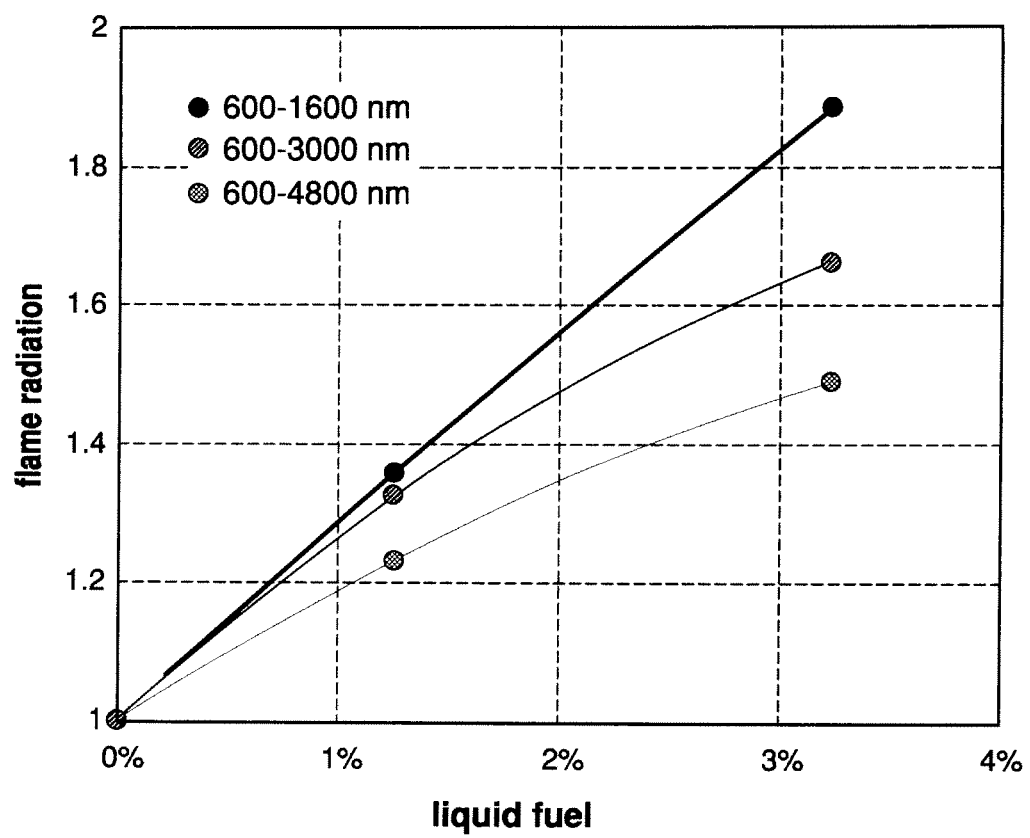
FIG. 6 is a graph showing the relationship between the percentage of liquid fuel used in an embodiment of the present invention and flame radiation.

FIG. 6 is a graph showing flame radiation intensity across three flame spectra for three different liquid fuel percentages (i.e., the liquid fuel energy input as a percentage of the total combined energy input of gaseous fuel and liquid fuel). The measurements were taken from test-firings of a prototype of the embodiment of the present invention described herein. The radiation values consist of integrated values across each of the three spectra and are normalized to radiation values without liquid fuel co-firing. As the graph clearly shows, a relationship exists between the amount of liquid fuel and flame luminosity, as well as demonstrating that significant increases in luminosity can be achieved with the burner of the present invention with relatively low percentages of liquid fuel.

It is recognized by those skilled in the art that changes may be made to the above-described embodiments of the invention without departing from the broad inventive concepts thereof. It is understood, therefore, that this invention is not limited to the particular embodiments disclosed but is intended to cover all modifications which are within the full scope of the claims.

The invention claimed is:

1. A combustion process comprising:
   injecting a liquid fuel from an atomizing nozzle of a burner into a precombustor passage, the liquid fuel having an effective momentum rate $M_L$ at the atomizing nozzle;
   injecting a gaseous fuel through a gaseous fuel discharge orifice of the burner into the precombustor passage thereby forming a sleeve of gaseous fuel about the liquid fuel proximate the atomizing nozzle, the gaseous fuel having a momentum rate $M_G$ at the gaseous fuel discharge orifice, wherein $M_L < M_G$;
   introducing a first oxidant gas through a primary oxidant discharge orifice of the burner into the precombustor passage thereby forming a sleeve of the first oxidant gas about the gaseous fuel proximate the gaseous fuel discharge orifice;
   combusting a portion of the gaseous fuel with a portion of the first oxidant gas in the precombustor passage to form a partially combusted mix; and
   passing the partially combusted mix into a furnace for further combustion thereof;
   wherein the burner is mounted in a wall of the furnace.

2. The process of claim 1, wherein $M_L < 0.8 \times M_G$.

3. The process of claim 1, further comprising:
   thermally cracking at least a portion of the liquid fuel in the precombustor passage.

4. The process of claim 1, further comprising:
   introducing a staging oxidant gas into the furnace; and
   combusting a portion of the partially combusted mix with at least a portion of the staging oxidant gas in the furnace.

5. The process of claim 1, wherein the liquid fuel has a bulk velocity $v_L$ at the atomizing nozzle, and wherein the gaseous fuel has a velocity $v_G$ at the gaseous fuel discharge orifice, wherein $v_L < v_G$.

6. The process of claim 1, wherein the liquid fuel has a mass flow rate $m_{LF}$ at the atomizing nozzle, and wherein the gaseous fuel has a mass flow rate $m_{GF}$ at the gaseous fuel discharge orifice, wherein $m_{LF} \leq 0.72 \times m_{GF}$.

7. The process of claim 6, wherein $0.0017 \times m_{GF} \leq m_{LF} \leq 0.36 \times m_{GF}$.

8. The process of claim 1 wherein the liquid fuel has a bulk velocity $v_L$ at the atomizing nozzle and wherein the gaseous fuel has a velocity $v_G$ at the gaseous fuel discharge orifice wherein $$\frac{v_L \left|\sin\left(\frac{A}{2}\right)\right|}{v_G} < 1,$$

where A is the liquid fuel spray angle in the width dimension.

9. The process of claim 1, wherein the first oxidant gas comprises at least 23 vol. % oxygen.

10. The process of claim 1, wherein the furnace is a glass-melting furnace.

11. The process of claim 1, wherein the furnace is a metal-melting furnace.

12. A combustion process comprising:
    injecting a liquid fuel from an atomizing nozzle of a burner into a precombustor passage, the liquid fuel having a higher heating value $HHV_{LF}$ and a mass flow rate $m_{LF}$;
    injecting a gaseous fuel through a gaseous fuel discharge orifice of the burner into the precombustor passage thereby forming a sleeve of gaseous fuel about the liquid fuel proximate the atomizing nozzle, the gaseous fuel having a higher heating value $HHV_{GF}$ and a mass flow rate $m_{GF}$, wherein $HHV_{GF} \times m_{GF} > 9 \times HHV_{LF} \times m_{LF}$;
    introducing an oxidant gas through a primary oxidant discharge orifice of the burner into the precombustor passage thereby forming a sleeve of the oxidant gas about the gaseous fuel proximate the gaseous fuel discharge orifice, the oxidant gas having an oxygen concentration of at least 23 vol. %;
    combusting a portion of the gaseous fuel with a portion of the oxidant gas in the precombustor passage to form a partially combusted mix; and
    passing the partially combusted mix into a furnace for further combustion thereof; wherein the burner is mounted in a wall of the furnace.

13. A burner comprising:
    a primary oxidant conduit with a primary oxidant discharge orifice, the primary oxidant conduit having a width-to-height ratio of at least 2 at the primary oxidant discharge orifice;
    a gaseous fuel conduit with a gaseous fuel discharge orifice in spaced relation to the primary oxidant discharge orifice, the gaseous fuel conduit having a width-to-height ratio of at least 2 at the gaseous fuel discharge orifice, wherein at least a portion of the gaseous fuel conduit is situated within the primary oxidant conduit;
    a liquid fuel conduit with a liquid fuel atomizing nozzle located at a discharge end of the liquid fuel conduit, the liquid fuel atomizing nozzle in spaced relation to the gaseous fuel discharge orifice, wherein at least a portion of the liquid fuel conduit is situated within the gaseous fuel conduit; and
    a precombustor passage that extends from the primary oxidant discharge orifice to a flame port, the precombustor passage having a width, $P_W$, and a height, $P_H$, wherein $$\frac{P_W}{P_H} \geq 2;$$

wherein the liquid fuel atomizing nozzle is capable of producing a spray with a width-to-height ratio greater than 2.0; and
wherein the burner is mounted to a wall of a furnace.

14. A burner comprising:
    a primary oxidant conduit with a primary oxidant discharge orifice;
    a gaseous fuel conduit with a gaseous fuel discharge orifice in spaced relation to the primary oxidant discharge orifice, the gaseous fuel conduit having a first cross-sectional area, $A_1$, wherein at least a portion of the gaseous fuel conduit is situated within the primary oxidant conduit;
    a liquid fuel conduit with a liquid fuel atomizing nozzle located at a discharge end of the liquid fuel conduit, the liquid fuel atomizing nozzle in spaced relation to the gaseous fuel discharge orifice, the liquid fuel atomizing nozzle having a second cross-sectional area, $A_2$, wherein at least a portion of the liquid fuel conduit is situated within the gaseous fuel conduit and wherein $$200 \leq \frac{A_1}{A_2};$$

a precombustor passage that extends from the primary oxidant discharge orifice to a flame port; and an oxidant staging passage terminating in an oxidant staging port wherein at least a portion of the oxidant staging passage is directly underneath the precombustor passage;

wherein the burner is mounted in a wall of a furnace.

15. The burner of claim 14, wherein $$500 \le \frac{A_1}{A_2} \le 74{,}000.$$

16. A burner comprising:
a primary oxidant conduit with a primary oxidant discharge orifice, the primary oxidant conduit having a width-to-height ratio of at least 2 at the primary oxidant discharge orifice;
a gaseous fuel conduit with a gaseous fuel discharge orifice in spaced relation to the primary oxidant discharge orifice, the gaseous fuel conduit having a width-to-height ratio of at least 2 at the gaseous fuel discharge orifice, wherein at least a portion of the gaseous fuel conduit is situated within the primary oxidant conduit;
a liquid fuel conduit with a liquid fuel atomizing nozzle located at a discharge end of the liquid fuel conduit, the liquid fuel atomizing nozzle in spaced relation to the gaseous fuel discharge orifice, wherein at least a portion of the liquid fuel conduit is situated within the gaseous fuel conduit; and
a precombustor passage that extends from the primary oxidant discharge orifice to a flame port, the precombustor passage having a length $P_L$, a width, $P_W$, and a height, $P_H$, wherein $$\frac{P_W}{P_H} \ge 2;$$

wherein the gaseous fuel discharge orifice is configured to form within the precombuster passage a sleeve of gaseous fuel about liquid fuel discharged from the liquid fuel atomizing nozzle;
wherein the primary oxidant discharge orifice is configured to form within the precombuster passage a sleeve of primary oxidant about gaseous fuel discharged from the gaseous fuel discharge orifice; and
wherein the burner is mounted to a wall of a furnace.

17. The burner of claim 16, wherein the liquid fuel atomizing nozzle is capable of producing a spray with a width-to-height ratio greater than 1 and a spray angle in the width dimension which is in a range of 0.9 to 6.0 times:

$$\arctan\left(\frac{0.5(P_W)}{P_L}\right).$$

18. The burner of claim 16, wherein the liquid fuel atomizing nozzle is capable of producing a spray with a width-to-height ratio greater than 1 and a spray angle in the width dimension which is in a range of 1.6 to 5.0 times:

$$\arctan\left(\frac{0.5(P_W)}{P_L}\right).$$

19. The burner of claim 16, further comprising an oxidant staging passage terminating in an oxidant staging port wherein at least a portion of the oxidant staging passage is directly underneath the precombustor passage.

20. The burner of claim 16, wherein the liquid fuel atomizing nozzle is capable of producing a spray with a width-to-height ratio greater than 2.0.

21. The burner of claim 16, wherein the liquid fuel atomizing nozzle is capable of producing a spray with a width-to-height ratio greater than 1 and a spray angle in the width dimension of up to 120 degrees.

22. The burner of claim 16, wherein the liquid fuel atomizing nozzle is capable of producing a spray with a width-to-height ratio greater than 1 and a spray angle in the width dimension between 30 and 95 degrees.

23. The burner of claim 16, wherein the liquid fuel atomizing nozzle comprises a liquid fuel discharge orifice in spaced relation to the gaseous fuel discharge orifice in a position ranging from being recessed 3 times the height of the gaseous fuel discharge orifice and protruding 0.75 times the height of the gaseous fuel discharge orifice.

24. The burner of claim 23, wherein the position ranges from being recessed 3 times the height of the gaseous fuel discharge orifice and even with the gaseous fuel discharge orifice.

* * * * *